(12) United States Patent
Geleji et al.

(10) Patent No.: US 10,592,313 B2
(45) Date of Patent: Mar. 17, 2020

(54) GRAPH OPTIMIZED MESSAGE MODEL PARSER

(71) Applicant: INTERNATIONAL BUSINESS MACHINES CORPORATION, Armonk, NY (US)

(72) Inventors: Geza Geleji, Eastleigh (GB); Martin A. Ross, Gosport (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 407 days.

(21) Appl. No.: 15/405,796

(22) Filed: Jan. 13, 2017

(65) Prior Publication Data
US 2018/0203695 A1    Jul. 19, 2018

(51) Int. Cl.
G06F 9/54     (2006.01)
G06F 8/20     (2018.01)
G06F 8/41     (2018.01)
G06F 9/38     (2018.01)
G06F 9/30     (2018.01)

(52) U.S. Cl.
CPC .............. G06F 9/546 (2013.01); G06F 8/20 (2013.01); *G06F 8/427* (2013.01); *G06F 9/30058* (2013.01); *G06F 9/3867* (2013.01)

(58) Field of Classification Search
CPC . G06F 9/546; G06F 8/20; G06F 8/427; G06F 9/3867; G06F 9/30058
See application file for complete search history.

(56) References Cited

U.S. PATENT DOCUMENTS

| 7,313,567 | B1 * | 12/2007 | Leung | G06F 16/88 |
| | | | | 707/797 |
| 7,362,909 | B2 * | 4/2008 | Watanabe | H04N 21/235 |
| | | | | 375/E7.024 |
| 7,870,295 | B2 | 1/2011 | Johnson | |

(Continued)

OTHER PUBLICATIONS

List of IBM Patents or Patent Applications Treated as Related 1 page.

(Continued)

*Primary Examiner* — Viva Miller
(74) *Attorney, Agent, or Firm* — Nicholas Bowman; Andrew D. Wright; Roberts Mlotkowski Safran Cole & Calderon, P.C.

(57) ABSTRACT

This invention relates to a system, method and computer program product for parsing a message against a message model, the message mode comprising hierarchical message element options organized into nodes and branches. The method includes: setting, by a computer device, a current node and current branch to a first node and first branch in the message model; setting, by the computer device, a return marker in the message at a point corresponding to the current node; parsing, by the computer device, the message from the return marker against the current branch of the message model; setting, by the computer device, the current branch to a further branch based on the current message model branch being not successfully parsed against the message; and parsing, by the computer device, the message again from the return marker whereby the parsing does not need to start from the beginning of the message model.

9 Claims, 5 Drawing Sheets

(56) References Cited

U.S. PATENT DOCUMENTS

| | | | |
|---|---|---|---|
| 8,484,230 B2* | 7/2013 | Harnett | G06F 16/332 707/755 |
| 8,522,255 B2 | 8/2013 | Kaiser | |
| 8,555,262 B2 | 10/2013 | Harnett et al. | |
| 8,626,624 B2 | 1/2014 | Parsons et al. | |
| 8,719,353 B2 | 5/2014 | Park et al. | |
| 8,880,557 B2 | 11/2014 | Takase | |
| 8,903,718 B2 | 12/2014 | Akuwudike | |
| 8,918,373 B2* | 12/2014 | Cheriyath | G06F 16/88 707/693 |
| 9,131,000 B2 | 9/2015 | Iyer | |
| 2004/0186920 A1* | 9/2004 | Birdwell | G06F 16/2264 710/1 |
| 2004/0205717 A1 | 10/2004 | Chiang et al. | |
| 2005/0289526 A1* | 12/2005 | Wang | G06F 8/10 717/144 |
| 2007/0044069 A1 | 2/2007 | Doucette et al. | |
| 2007/0130178 A1* | 6/2007 | Kimura | G06F 3/1204 |
| 2007/0226754 A1 | 9/2007 | Grabarnik et al. | |
| 2009/0049007 A1* | 2/2009 | Kimber | G06F 17/2211 |
| 2009/0285112 A1* | 11/2009 | Lee | H04B 7/2606 370/252 |
| 2012/0197914 A1* | 8/2012 | Harnett | G06F 16/332 707/755 |
| 2012/0254262 A1 | 10/2012 | Belisario et al. | |
| 2013/0086069 A1 | 4/2013 | Phillips | |
| 2014/0007050 A1 | 1/2014 | Belisario et al. | |
| 2014/0230006 A1* | 8/2014 | Burke | H04L 63/20 726/1 |
| 2015/0161098 A1 | 6/2015 | Granshaw et al. | |
| 2016/0259806 A1 | 9/2016 | Kapoor et al. | |
| 2017/0091735 A1 | 3/2017 | Kulpati et al. | |

OTHER PUBLICATIONS

Specification "Message Parser Runtime Choices" and Drawings in U.S. Appl. No. 15/405,763, filed Jan. 13, 2017, 29 pages.

Specification "Message Choice Model Trainer" and Drawings in U.S. Appl. No. 15/405,816, filed Jan. 13, 2017, 29 pages.

IBM Knowledge Center, "Data Format Description Language (DFDL) v1.0 Specification", http://www.ibm.com/support/knowledgecenter/SSMKHH_10.0.0/com.ibm.dfdl.spec.doc/dfdl_index.htm, Accessed Dec. 8, 2016, 127pages.

"XML Schema Choice Element", W3Schools.Com, https://web.archive.org/web/20160406203106/http://www.w3schools.com, Accessed Dec. 8, 2016, 5 pages.

Boer et al., "Combining Monitoring with Run-Time Assertion Checking", http://envisage-project.eu/wp-content/uploads/2015/02/frank_stijn_sfm.pdf, Accessed Dec. 9, 2016, 48 pages.

Office Action in U.S. Appl. No. 15/405,816 dated Jul. 16, 2019, 32 pages.

Office Action in related U.S. Appl. No. 15/405,763 dated Apr. 5, 2019, 15 pages.

Notice of Allowance dated Oct. 25, 2019 in U.S. Appl. No. 15/405,763, 13 pages.

* cited by examiner

Graph Optimized Message Model (schematic)

REGULAR
MESSAGE MODEL fieldA::string -terminator=;
fieldB::string -terminator=;
choice {
 *complexElementX: separator=,*
  *id::string -initiator=id:*
  *reference::string -initiator=ref:*
  *fieldXA::int -initiator=x: length=4bytes, binary*
 *complexElementY: separator=,*
  *id::string -initiator=id:*
  *reference::string -initiator=ref:*
  *fieldYA::double -initiator=y: length=8 bytes, binary*
}
fieldC::string Compiles to

GRAPH OPTIMIZED MESSAGE MODEL fieldA::string -terminator=;
fieldB::string -terminator=;
choice {

*complex[ElementX OR ElementY]: separator=,*
  *id::string -initiator=id:*
  *reference::string -initiator=ref:*

*[fieldXA::int -initiator=x: length=4bytes, binary*
*OR*
  *fieldYA::double -initiator=y: length=8 bytes, binary]*

}
fieldC::string

FIG. 5

GRAPH OPTIMIZED MESSAGE MODEL PARSER

BACKGROUND

The present invention relates to a method and apparatus for a graph optimized message model parser for optimizing parsing of message model choices.

Message models provide a method for describing the logical structure of message data. A typical message model may be composed of both simple and complex elements, and either sequences or choices between said elements at different levels within the structure. A choice construct enables a developer to model a message such that a particular element (complex or simple) may be one of a plurality of element types. However, in the case of a choice of complex structures in order for the run-time to parse a message correctly then the run time will parse the structure as each of the plurality of possible structures in turn until it reaches the one that parses correctly. This can lead to excessive parsing and CPU cost.

SUMMARY

In a first aspect of the invention there is provided a system for parsing a message against a message model, the message model comprising hierarchical message element options organized into nodes and branches. The system includes: a processor, a computer readable memory, and a computer readable storage medium associated with a computer device; program instructions of an initializer configured to set a current node and current branch to a first node and first branch in the message model; program instructions of a return marker configured to set a return mark in the message at a point corresponding to the current node; program instructions of a branch parser configured to parse the message from the return mark against the current branch of the message model; and program instructions of a graph changer configured to set the current branch to a further branch based on the current message model branch being not successfully parsed against the message. The program instructions are stored on the computer readable storage medium for execution by the processor via the computer readable memory. The branch parser is configured to parse the message again from the return mark so that parsing does not need to start from the beginning of the message model.

In a second aspect of the invention there is provided a computer-implemented method for parsing a message against a message model, the message model comprising hierarchical message element options organized into nodes and branches. The method includes: setting, by a computer device, a current node and current branch to a first node and first branch in the message model; setting, by the computer device, a return marker in the message at a point corresponding to the current node; parsing, by the computer device, the message from the return marker against the current branch of the message model; setting, by the computer device, the current branch to a further branch based on the current message model branch being not successfully parsed against the message; and parsing, by the computer device, the message again from the return marker whereby the parsing does not need to start from the beginning of the message model.

In a third aspect of the invention there is provided a computer program product for parsing a message against a message model, the message mode comprising hierarchical message element options organized into nodes and branches, the computer program product comprising a computer readable storage medium having program instructions embodied therewith, the program instructions executable by a processor to cause the processor to: set a current node and current branch to a first node and first branch in the message model; set a return mark in the message at a point corresponding to the current node; parse the message from the return mark against the current branch of the message model; set the current branch to a further branch based on the current message model branch being not successfully parsed against the message; and parse the message again from the return mark.

BRIEF DESCRIPTION OF THE DRAWINGS

Preferred embodiments of the present invention will now be described, by way of example only, with reference to the following drawings in which.

DETAILED DESCRIPTION

Figure 1:
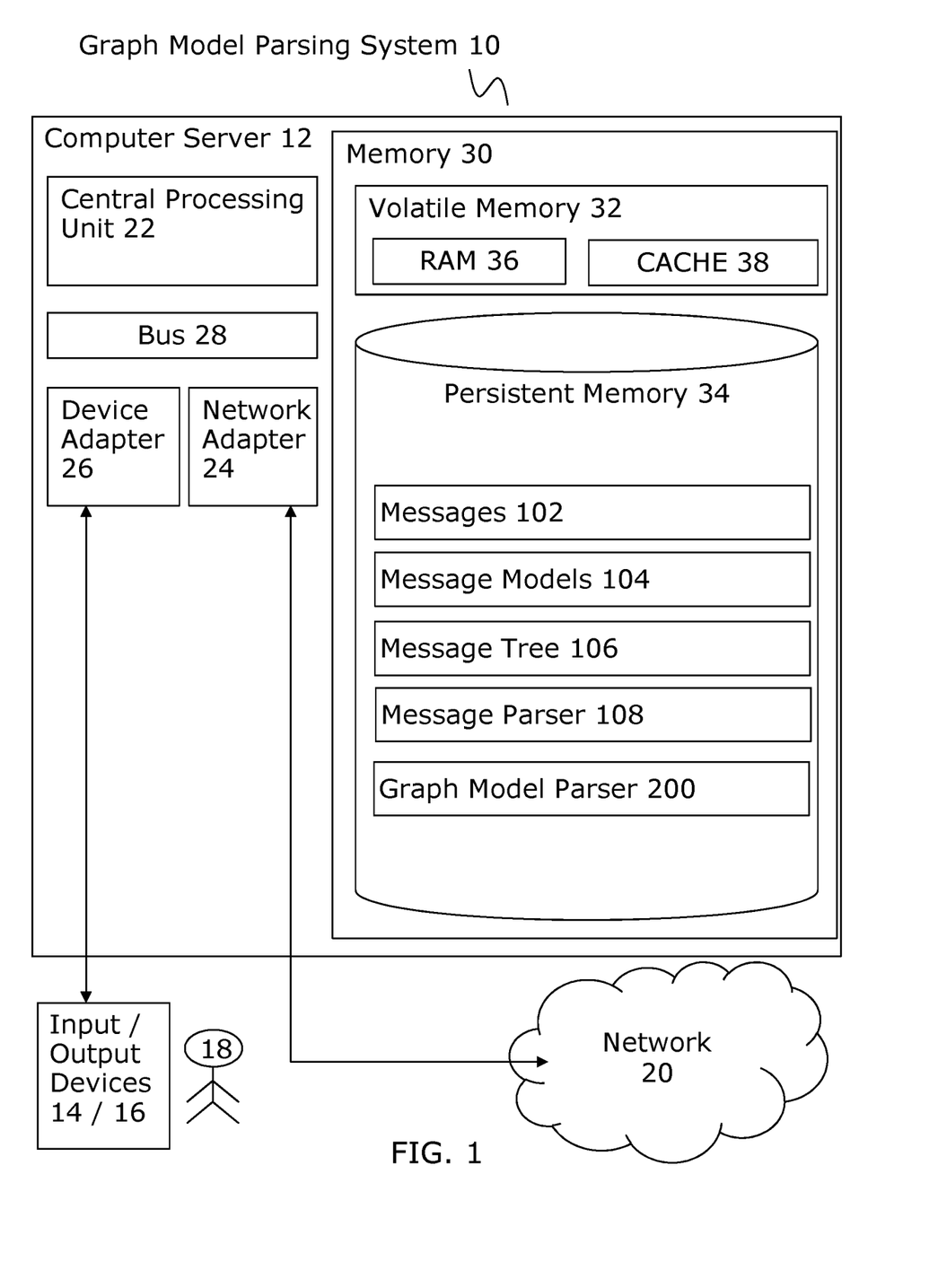
FIG. 1 is a deployment diagram of a system in accordance with aspects of the invention.

Referring to FIG. 1, the deployment of an embodiment of a graph model parsing system 10 is described. Graph model parsing system 10 is operational with numerous other general purpose or special purpose computing system environments or configurations. Examples of computing processing systems, environments, and/or configurations that may be suitable for use with graph model parsing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Graph model parsing system 10 may be described in the general context of computer system executable instructions, such as program modules, being executed by a computer processor. Generally, program modules may include: routines; programs; objects; components; logic; and data structures that perform particular tasks or implement particular abstract data types. Graph model parsing system 10 may be embodied in distributed cloud computing environments where tasks are performed by remote processing devices that are linked through a communications network. In a distributed cloud computing environment, program modules may be located in both local and remote computer system storage media including memory storage devices.

In embodiments, graph model parsing system 10 comprises: general purpose computer server 12 and one or more input devices 14 and output devices 16 directly attached to the computer server 12. Graph model parsing system 10 is connected to a network 20. Graph model parsing system 10 may communicate with a user 18 using input devices 14 and output devices 16. Input devices 14 may include one or more of: a keyboard; a scanner; and a mouse, trackball or another pointing device. Output devices 16 may include one or more of a display or a printer. Graph model parsing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations may include: incrementing or decrementing a value in a register; transferring a value from memory 30 to a register or vice versa; branching to a different location in memory if a condition is true or false (also referred to as a conditional branch instruction); and adding or subtracting the values in two different registers and loading the result in another register. A typical CPU can perform many different machine operations. A set of machine instructions is called a machine code program; the machine instructions are written in a machine code language which is referred to a low level language. A computer program written in a high level language is compiled to a machine code program before it can be run. Alternatively, a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Graph model parsing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: messages 102; message models 104; message trees 106; message parser 108; and graph model parser 200. In one embodiment, ROM in the memory 30 stores the program modules that enables the computer server 12 to function as a special purpose computer specific to the program modules. Further program modules that support the preferred embodiment but are not shown include firmware, boot strap program, operating system, and support applications. Each of the operating system; support applications; other program modules; and program data; or some combination thereof; may include an implementation of a networking environment.

Messages 102 arrive at the message parsing system from other computer systems in the network and are stored in persistent memory 34.

Message models 104 comprise one or more models for defining how a message can be broken down into message elements.

Message trees 106 comprise one or more message tree data structures. Each message tree comprises structured message elements parsed from a message with reference to a message model.

Message parser 108 is for breaking down a message into message elements for a message tree according to a message model.

Graph model parser 200 is for optimizing the process of message parser 108 and is described in more detail with respect to FIG. 2 below.

Graph model parsing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with message parsing system 10. Examples, include, but are not limited to: microcode, device drivers, redundant processing units, external disk drive arrays, redundant array of independent disks (RAID), tape drives, and data archival storage systems.

Figure 2:
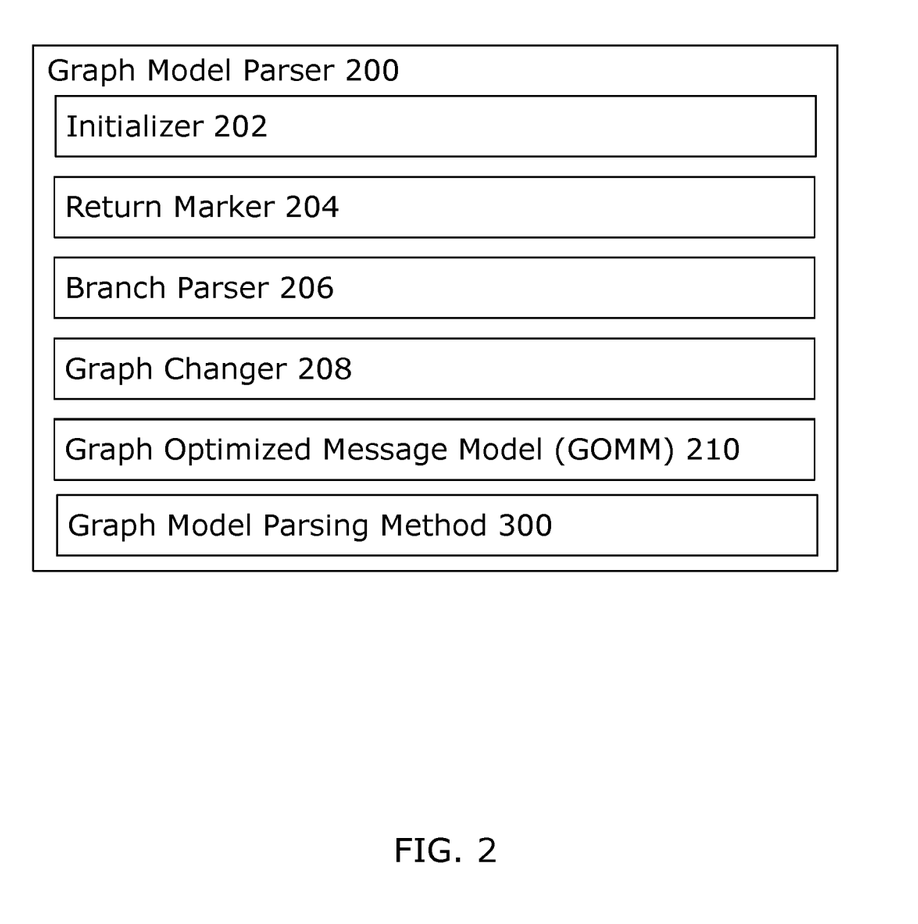
FIG. 2 is a component diagram of a graph model parser in accordance with aspects of the invention.

Referring to FIG. 2, graph model parser 200 comprises the following components: initializer 202; return marker 204; branch parser 206; graph changer 208; graph optimized message model (GOMM) 210; and graph model parsing method 300. Graph model parser 200 is configured for parsing a message against a message model, the message mode comprising hierarchical message element options organized into nodes and branches.

Initializer 202 is configured for setting a current node and current branch to a first node and first branch in the message model.

Return marker 204 is configured for setting a return mark in the message at a point corresponding to the current node.

Branch parser 206 is configured for parsing the message from the return marker against the current branch of the message model and for parsing the message again from the return marker so that parsing does not need to start from the beginning of the message model.

Graph changer 208 is configured for setting the current branch to a further branch if the current message model branch is not successfully parsed against the message. Graph changer 208 is further configured for setting a new node in the message model as the current node and setting a new return marker if the current message model branch is successfully parsed against the message. Graph changer 208 is further configured for setting the current branch to a further branch on a previous node if there is no further branch on the current node.

Graph optimized message model (GOMM) 210 is configured for storing a message model in graph form comprising hierarchical element options organized into branches and nodes.

Figure 3:
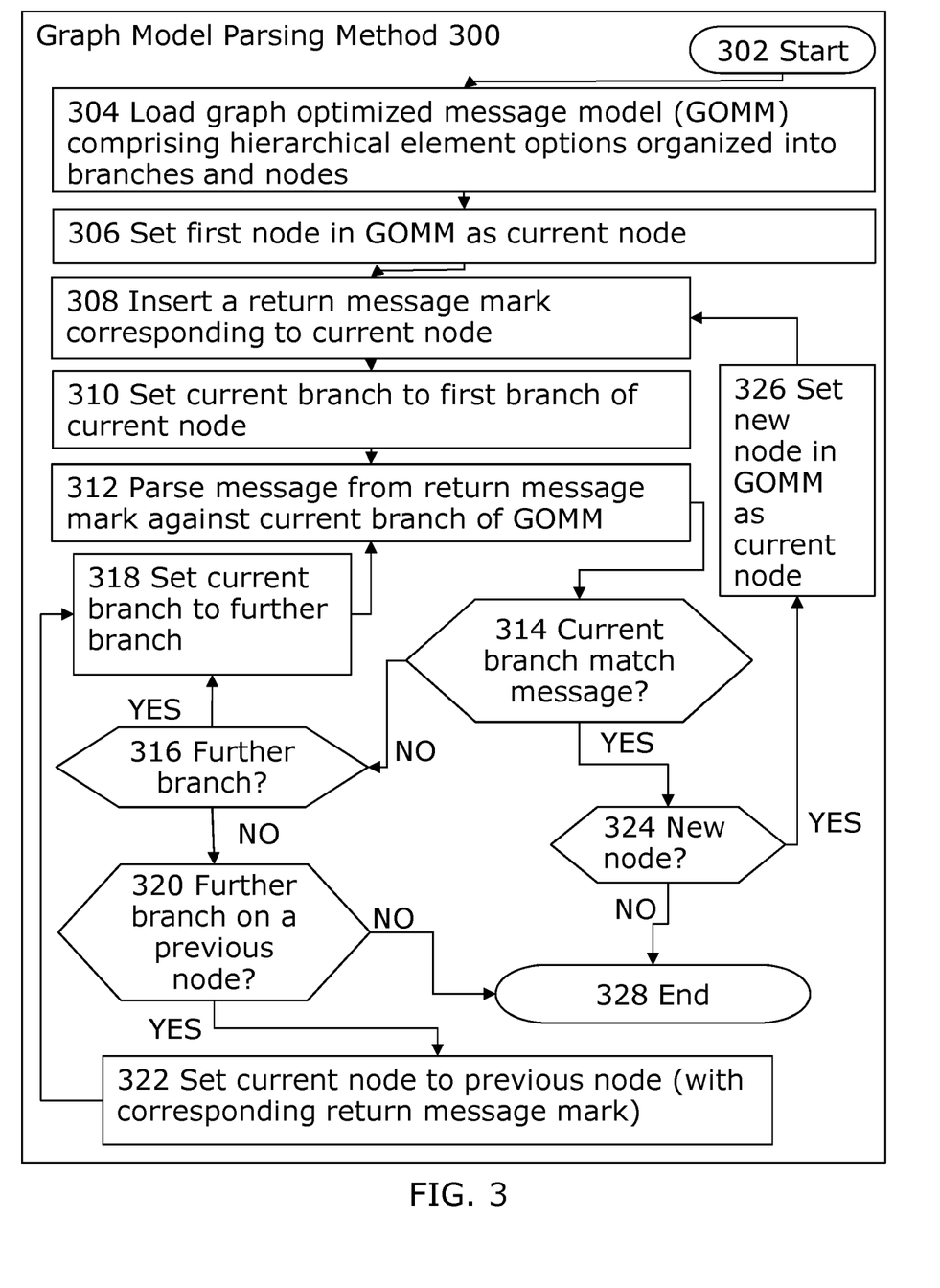
FIG. 3 is a flow diagram of a process in accordance with aspects of the invention.

Referring to FIG. 3, exemplary graph model parsing method 300 comprises logical process steps 302 to 328 for parsing a message against a message model, the message mode comprising hierarchical message element options organized into nodes and branches. In embodiments, and as described with respect to FIGS. 4A and 4B, the steps of the method are performed by one or more of the modules described with respect to FIGS. 1 and 2.

Step 302 is the start of the method when a message is required to be parsed.

Step 304 includes loading a graph optimized message model (GOMM) comprising hierarchical element options organized into branches and nodes.

Step 306 includes setting first node in GOMM as current node.

Step 308 includes inserting a return message mark corresponding to current node.

Step 310 includes setting a current branch to first branch of current node.

Step 312 includes parsing the message from return message mark against current branch of GOMM.

Step 314 includes continuing to step 324 if the message parsed successfully against the current branch. Else, if the message did not parse successfully against the current branch, then continuing to step 316.

Step 316 includes continuing to step 318 if there is a further branch or to step 320 if there is no further branch.

Step 318 includes setting the current branch to the further branch and looping back to step 312.

Step 320 includes continuing to step 322 if there is a further branch on a previous node or for continuing to step 328 is there is no further branch on a previous node.

Step 322 includes setting the current node to the previous node. The previous node has a corresponding return message mark. The method continues at step 318.

Step 324 includes continuing to step 326 if there is a new node to parse. Else step 328.

Step 326 includes setting a new node in the GOMM as the current node and continuing at step 308.

Step 328 is the end of the method.

Figure 4A:
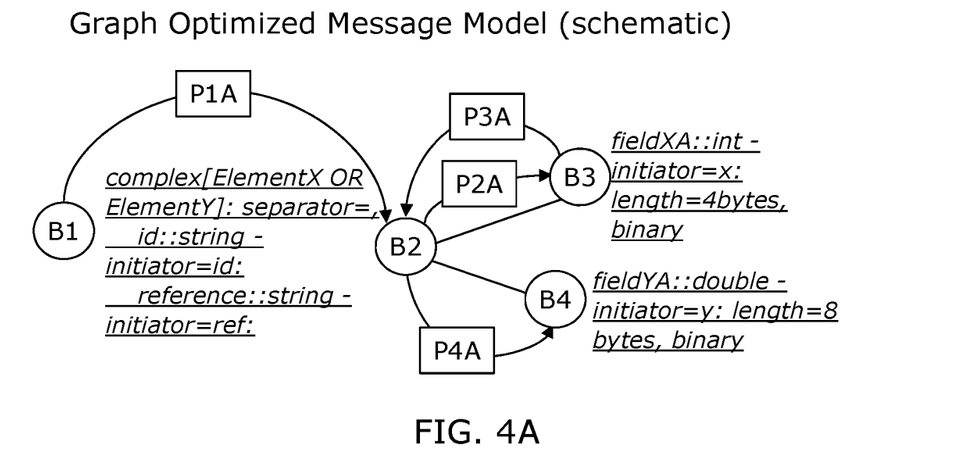
FIG. 4A is an example schematic graph optimized message model in accordance with aspects of the invention.

Referring to FIG. 4A, an example schematic graph optimized message model of the preferred embodiment is shown. The graph optimized message model (GOMM) comprises two message element options organized into nodes (B1, B2, B3, B4) and branches (B1B2, B2B3, B3B4). The common message element is represented in the graph by B1B2 as a complex that has common structure for two different element X and Y. Hence, the common message element has the following in common: the separator character is the same parameter (a comma); the identifier (id) is the same type of variable (a string); the reference is the same type of variable (a string) and has the same initiator ("ref").

complex[ElementX OR ElementY]: separator=, id:: string-initiator=id: reference::string-initiator=ref:

The first option branch is represented in the graph by B2B3 and defines the remaining part of the complex as a binary integer field XA of 4 bytes having an initiator x.

fieldXA::int-initiator=x: length=4 bytes, binary

The second option branch is represented in the graph by B2B4 and defines the remain part of the complex as a double floating point field YA of 8 bytes having an initiator y.

Figure 4B:
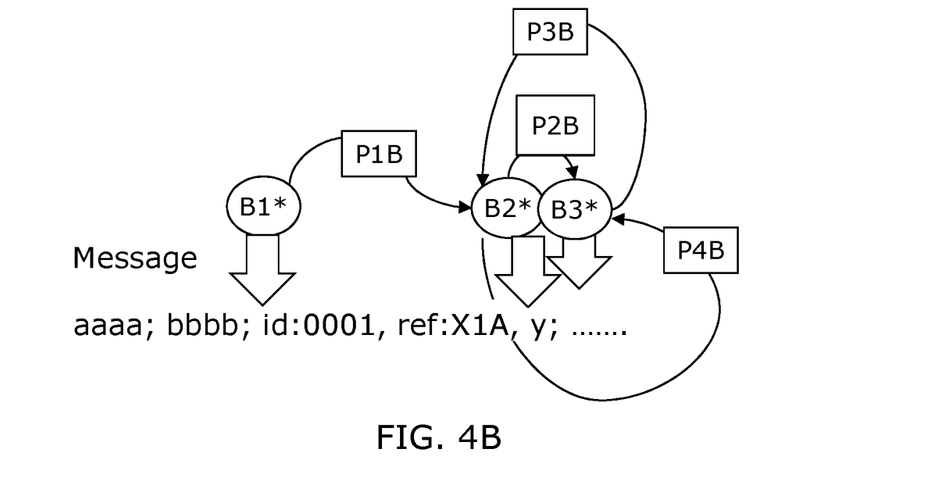
FIG. 4B is an example message being parsed against a graph optimized message model in accordance with aspects of the invention.

Referring to FIG. 4B, a string message for parsing by the preferred embodiment is shown comprising the text:

aaaa; bbbb; id:0001, ref:X1A, y;

The dots at the end of the message represent that the message may (or may not) continue with further characters. The "aaaa;" and "bbbb;" are initial characters and parsing of the message starts at point B1* corresponding to point B1 of the message model. Points B1*, B2* and B3* are return marks for the message (either embedded or pointing directly at positions in the message) created by the return marker of preferred embodiment.

In embodiments, when the graph model parser 200 is initiated it loads the graph optimized message model (step 304) before setting a current node (B2) and current branch (B1B2) to a first node and first branch in the message model (step 306 and 310). A return mark (B2*) is set in the message at a point corresponding to the current node (B2) (step 308).

The message is then parsed (P1A, P1B and step 312) from the return mark against the current branch of the message model such that the common branch B1B2 is successfully parsed and message values allocated to model definitions.

In the example, a successful parse indicates that the current model branch matches the message so the method continues through step 314 to step 324. B3 is a new node from the current branch in the message model (step 324) and the method continues at step 326 where B3 is set as the current node.

A new return message mark B3* is inserted in the message corresponding to the current node (step 308 again) and the current branch is set to B2B3 (step 310).

The message is parsed again (P2A, P2B and step 312) but is not successful this time because the message has an initiator of character "y" not a "x" as in the element option and the method continues to step 316.

B2B4 is a further branch so the method sets (step 318) the current branch to B2B4 and the message is parsed again (P4A, P4B and step 312) using the same return mark B2* and not having to track back to the beginning of the message option. The track back to return mark B2* (associated with B2) is represented by arrow P3B (associated with arrow P3A).

This time the parse is successful and the there are no new nodes so the method ends at step 328.

In this example there are only two options, but more complex models could involve a plurality of choices. An embodiment may compare adjacent choice options (for implementations that do not enable choice options to be attempted out of sequence). Another embodiment can compare each option to each other and provide additional meta-data to the "option branching marks" to state when they are applicable (that is moving between parsing as option2 and option4, for when implementations of the parser allow for choice options to be attempted out of sequence, for instance when order in which they are attempted is based on workload learning).

Without help the runtime will first attempt to parse the message as complexElementX, and if that fails it will jump back to the offset corresponding with the start of the choice and re-parse, in the above example if it failed at fieldXA because it found fieldYA, it would have to re-parse the "id" and reference fields. A significant performance improvement is attained from the above example, and there are potentially be more significant performance gains for more complex models. The value is reduced parsing cost associated with choice constructs. Implementations of the invention thus provide improvements to the function of the computer system performing the parsing.

Figure 5:
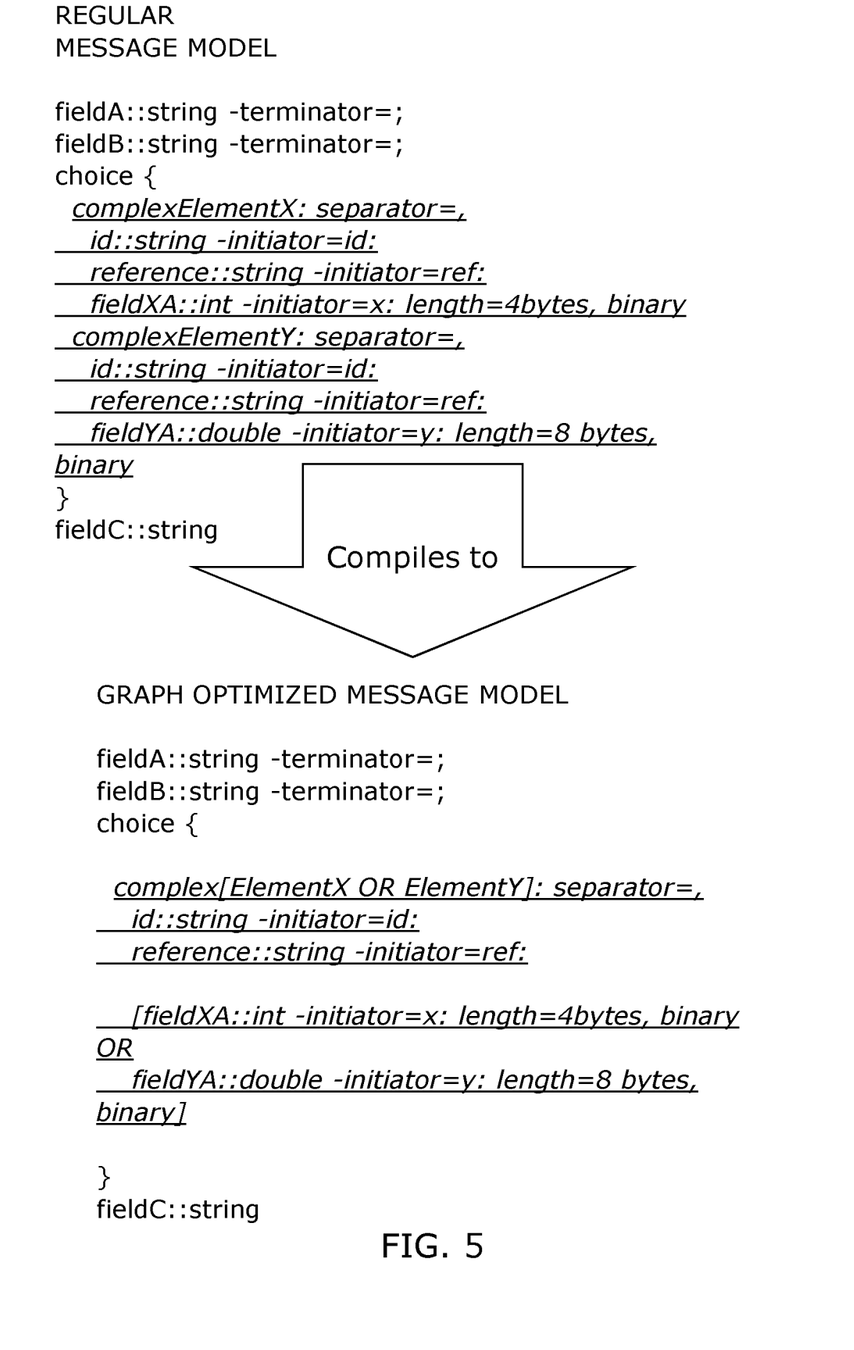
FIG. 5 is an example message model compiled into a graph optimized message model in accordance with aspects of the invention.

Referring to FIG. 5, the example graph optimized message model is shown after compiling from its originating message model. The element options are shown underlined and in italics both before and after compiling.

In this example, a compiler compares "complexElementX" to "complexElementY" to determine the first point at which they differ. Properties of "complexElementX" and "complexElementY" are first compared (for example initiators and separators). If these match then the first elements are then compared (assuming the properties state the elements appear in order). The first elements are compared to determine if they are equivalent (for example initiators, encoding, length, and terminators). Identity "id" is equivalent in both structures so "reference" is compared which is also identical. "fieldXA" is then compared to "fieldYA" which differs as they have a different type and properties (initiator). An "option branching mark" is the set prior to the element that differed in both options and linked to each other (prior to both "fieldXA" and "fieldYA").

In one embodiment, actual compiling is not necessary and the graph is organized virtually not physically.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A system for parsing a message against a message model, the system comprising:
   a processor, a computer readable memory, and a computer readable storage medium associated with a computer device;
   a first set of program instructions configured to:
      load a graph optimized message model, the graph optimized message model comprising:
         a hierarchical arrangement of a plurality of nodes and a plurality of branches, each branch of the plurality of branches connecting two nodes of plurality of nodes,
         wherein a first portion of the plurality of branches are common message elements, and
         wherein a second portion of the plurality of branches are different message element options;
      set a current node to a first node within the plurality of nodes of the graph optimized message model, the first node connected to one of the first portion of plurality of branches, and the first node connected to at least two of the second portion of the plurality of branches; and
      set a current branch to a first branch of second portion of the plurality of branches, the first branch connecting the first node to a second node of the plurality of nodes of the graph optimized message model;
   a second set of program instructions configured to set a return mark in the graph optimized message model at a point corresponding to the current node;
   a third set of program instructions configured to parse a message from the return mark against the current branch of the graph optimized message model;
   a fourth set of program instructions configured to set the current branch to a second branch of the second portion of the plurality of branches when the message did not successfully parse, the second branch being different than the first branch, the second branch connecting the first node to a new node of the plurality of nodes different than the second node, the new node being at a same level in the hierarchal arrangement as the second node; and
   a fifth set of program instructions configured to direct the third set of program instructions to parse the message again from the return mark,
   wherein the program instructions are stored on the computer readable storage medium for execution by the processor via the computer readable memory; and
   the fourth set of program instructions and the fifth set of program instructions are configured to parse the message again at a point of an unsuccessful parse using a different message element option so that parsing does not need to start from the beginning of the message model.

2. The system according to claim 1, further comprising a sixth set of program instructions configured to:
   execute when the message successfully parses against the current branch;
   set the second node of the plurality of nodes as the current node; and
   set a third branch of the plurality of branches to the current branch, the third branch connecting the second node to a third node of the plurality of nodes different than the first node and lower in the hierarchal arrangement than the second node;

set a new return mark in the graph optimized message model at a point corresponding to the current node; and direct the third set of program instructions to parse the message from the new return mark against the third branch.

3. The system according to claim 1, further comprising a seventh set of program instructions configured to:

execute when the message does not successfully parse and when the graph optimized message model lacks any branches connected to the current node against which the message was not parsed;

set the current node to a third node of the plurality nodes, the third node higher in the hierarchal arrangement than the first node;

set the current branch to a third branch of the plurality of branches, the third branch connecting the third node to a fourth node of the plurality nodes different than the first node; and parse the message against the third branch.

4. A computer-implemented method for parsing a message against a message model, the method comprising:

obtaining, by a computer device, a graph optimized message model comprising:

a hierarchical arrangement of a plurality of nodes and a plurality of branches, each branch of the plurality of branches connecting two nodes of plurality of nodes, wherein a first portion of the plurality of branches are common message elements, and wherein a second portion of the plurality of branches are different message element options;

setting, by the computer device, a current node to a first node of the plurality of nodes, the first node being connected to one of the first portion of plurality of branches, and the first node being connected to at least two of the second portion of the plurality of branches;

setting, by the computer device, a current branch to a first branch of the second portion of the plurality of branches, the first branch connecting the first node to a second node of the plurality of nodes;

setting, by the computer device, a return marker in the graph optimized message model at a point corresponding to the current node;

parsing, by the computer device, a message from the return marker against the current branch of the graph optimized message model; and in response to unsuccessfully parsing the message:

setting, by the computer device, the current branch to a second branch of the second portion of the plurality of branches, the second branch being different than the first branch, the second branch connecting the first node to a new node of the plurality of nodes different than the second node, the new node being at a same level in the hierarchal arrangement as the second node; and parsing, by the computer device, the message again from the return marker, whereby the setting the current branch to a second branch and the parsing the message again from the return marker parses the message again at a point of an unsuccessful parse using a different message element option so that parsing does not need to start from the beginning of the message model.

5. The method according to claim 4, further comprising carrying out a successful parse operation when the message successfully parsed against the current branch, the successful parse operation comprising:

setting the second node of the plurality of nodes in the graph optimized message model as the current node;

setting a third branch of the plurality of branches to a new current branch, the third branch connecting the second node to a third node of the plurality of nodes different than the first node and lower in the hierarchal arrangement than the second node;

setting a new return marker in the graph optimized message model at a point corresponding to the current node; and parsing the message against the third branch.

6. The method according to claim 4, further comprising carrying out a backtrack operation when the message did not successfully parse against the second branch and when the graph optimized message model lacks any branches connected to the current node against which the message was not parsed, the backtrack operation comprising:

setting the current node to a third node of the plurality nodes, the third node higher in the hierarchal arrangement than the first node;

setting the current branch to a third branch of the plurality of branches, the third branch connecting the third node to a fourth node of the plurality of nodes different than the first; and parsing the message against the third branch.

7. A computer program product for parsing a message against a graph optimized message model the computer program product comprising a computer readable storage medium having program instructions embodied therewith, the program instructions executable by a processor to cause the processor to:

obtain a graph optimized message model comprising:

a hierarchical arrangement of a plurality of nodes and a plurality of branches, each branch of the plurality of branches connecting two nodes of plurality of nodes, wherein a first portion of the plurality of branches are common message elements, and wherein a second portion of the plurality of branches are different message element options set a current node to a first node of the plurality of nodes, the first node being connected to one of the first portion of plurality of branches, and the first node being connected to at least two of the second portion of the plurality of branches;

set a current branch to a first branch of the second portion of the plurality of branches, the first branch connecting the first node to a second node of the plurality of nodes;

set a return marker in the graph optimized message model at a point corresponding to the current node;

parse a message from the return marker against the current branch of the graph optimized message model; and in response to unsuccessfully parsing the message:

set the current branch to a second branch of the second portion of the plurality of branches, the second branch different than the first branch, the second branch connecting the first node to a new node of the plurality of nodes different than the second node, the new node at a same level in the hierarchal arrangement as the second node; and parse the message again from the return marker, whereby the setting the current branch to a second branch and the parsing the message again from the return marker parses the message again at a point of an unsuccessful parse using a different message element option so that parsing does not need to start from the beginning of the message model.

8. The computer program product of claim 7, wherein in response to the message being successfully parsed against the current branch, the program instructions cause the processor to:
   set the second node of the plurality of nodes in the graph optimized message model as the current node;
   set a third branch of the plurality of branches to a new current branch, the third branch connecting the second node to a third node of the plurality of nodes different than the first node and lower in the hierarchal arrangement than the second node;
   set a new return marker in the graph optimized message model at a point corresponding to the current node; and
   parse the message against the third branch.

9. The computer program product of claim 7, wherein in response to the message not being successfully parsed against the second branch and the graph optimized message model lacking any branches connected to the current node against which the message was not parsed, the program instructions cause the processor to:
   set the current node to a third node of the plurality nodes, the third node higher in the hierarchal arrangement than the first node;
   set the current branch to a third branch of the plurality of branches, the third branch connecting the third node to a fourth node of the plurality of nodes different than the first node; and
   parse the message against the third branch.

* * * * *